United States Patent [19]
Prieto et al.

[11] Patent Number: 5,906,982
[45] Date of Patent: May 25, 1999

[54] NUTRITIONAL FORMULATIONS CONTAINING LACTO-N-NEOTETRAOSE

[75] Inventors: Pedro A. Prieto, West Worthington; Terry A. Kroening, Gahanna, both of Ohio

[73] Assignee: Abbott Laboratories, Abbott Park, Ill.

[21] Appl. No.: 08/829,220

[22] Filed: Mar. 31, 1997

[51] Int. Cl.$^6$ .................. A01N 43/04; A61K 31/715
[52] U.S. Cl. ................ 514/61; 426/601; 426/602; 426/606; 426/607; 426/608; 426/648; 426/658; 426/801
[58] Field of Search ..................... 726/601, 602, 726/606, 607, 608, 648, 658, 801; 514/61

[56] References Cited

U.S. PATENT DOCUMENTS

| | | | |
|---|---|---|---|
| 4,851,338 | 7/1989 | Mardh et al. | 435/34 |
| 4,919,961 | 4/1990 | Lundblad | 426/580 |
| 5,288,637 | 2/1994 | Roth | 435/288 |

FOREIGN PATENT DOCUMENTS

| | | |
|---|---|---|
| 0518409 | 9/1953 | Belgium . |
| 0313533 | 4/1989 | European Pat. Off. . |
| 9116449 | 10/1991 | WIPO . |
| WO 95/24495 | 9/1995 | WIPO . |
| 9610086 | 4/1996 | WIPO . |
| 961086 | 4/1996 | WIPO . |

OTHER PUBLICATIONS

J. Sambrook et al., *Molecular Cloning: A Laboratory Manual*, 2nd Edition, Cold Spring Harbor Laboratory Press (1989).

B.W. Petschow et al., "Growth Promotion of Bifidobacterium Species by Whey and Casein Fractions From Human and Bovine Milk", *Journal of Clinical Microbiology*, Feb., (1990), pp. 287–292.

H. Beerens et al., "Influence of Breast–Feeding on the Bifid Flora of the Newborn Intestine", *The American Journal of Clinical Nutrition*, vol. 33, (1980), pp. 2434–2439.

PCT Search Report corresponding to PCT/US98/06217.

Kobata et al., "Oligosaccharides of Human Milk" Journ of Bio Chem vol. 244, No. 20, pp. 5496–5502, 1969.

Henker et al., "Variations of Neutral Oligosaccharides and Lactose in Human Milk During the Feeding" 32:262–269(1993).

*Primary Examiner*—Frederick Krass
*Attorney, Agent, or Firm*—Cheryl L. Becker

[57] ABSTRACT

A nutritional formulation containing an effective amount of Lacto-N-neoTetraose to simulate the growth and/or metabolic activity of Bifidobacterium is provided. A process of inhibiting bacterial infections including the step of feeding the nutritional composition to a subject is also provided.

12 Claims, No Drawings

NUTRITIONAL FORMULATIONS CONTAINING LACTO-N-NEOTETRAOSE

TECHNICAL FIELD OF THE INVENTION

The present invention relates generally to the composition of nutritional products containing lacto-N-neotetraose for stimulating the growth and/or metabolic activity of bacteria of the genus Bifidobacterium. Furthermore, the present invention pertains to enteral nutritional formulations containing an anti-bacterial amount of lacto-N-neotetraose and the use of such formulations for preventing bacterial infections.

BACKGROUND OF THE INVENTION

Before birth, a fetus exists in a practically germ-free state, as the fetus is protected by the defense mechanisms of its mother. During parturition, the neonate is exposed to an abundance of bacteria from the mother's vaginal and skin flora as well as from the surrounding environment. Several weeks after its birth, the intestinal microflora of the neonate becomes established. The composition of this microflora is relatively simple and is believed to be influenced by the variety of bacteria the baby comes in contact with as well as the baby's diet.

In the first few months of life, an infant's diet consists mainly of human breast milk and/or formula. Human breast milk is well-known to contain more than 100 different oligosaccharides, some of which are genetically determined. Unfortunately, the structural similarities of many of the carbohydrates have made it difficult to isolate, identify and quantify these oligosaccharides.

Many beneficial functions have been attributed to human milk and its oligosaccharides. In fact, several studies have found that the stool of breast-fed infants differs from that of formula-fed infants. More specifically, studies have shown that stool from breast-fed infants has a lower pH, a higher proportion of bacteria of the genus Bifidobacterium, and a lower proportion of less desirable putrefactive-type bacteria than the stools from formula-fed infants. Studies have found that the low pH of human breast milk (5.0) inhibits the growth of Bacteroides spp., Clostridium, spp. and *Escherichia coli* (*E. coli*). (Beerens, H., et al., *Amer. J. Clin. Nut.* 33:2434–2439 (November 1980, this reference, as well as all other publications and patents disclosed herein, are incorporated by reference). Therefore, the breast-fed infant possesses a natural defense against Bacteroides, Clostridium, and *E. coli*, which gives the infant a resistance to gastroenteritis. Id. Furthermore, the introduction of cow's milk or formula into the diet of an exclusively breast-fed infant usually results in a substantial increase in the number of these bacteria. Petschow, B. W., et al., *J. Clin. Microbio.*, 28:287–292 (1990).

Human breast milk is believed to contain certain factors which promote the development of a favorable intestinal bacterial flora, specifically, Bifidobacterium, which discourage the proliferation of pathogenic microbes. The growth of Bifidobacterium in the intestine of a baby is believed to be promoted by the physicochemical properties of human milk, particularly its high lactose content, which is a substrate for Bifidobacterium, its low protein content, and its low buffering capacity. Unfortunately, infant formula is believed to have a high buffering capacity which is not favorable for the growth of Bifidobacterium. Therefore, a need exists for a nutritional product for use in infants that promotes the growth and proliferation of favorable intestinal microflora such as for example, Bifidobacterium while inhibiting the growth of for example, Bacteroides, Clostridium, and *E. coli*.

BRIEF SUMMARY OF THE INVENTION

The present invention provides a synthetic nutritional formulation that contains Lacto-N-neoTetraose. The nutritional formulation contains an amount of Lacto-N-neoTetraose that is effective to stimulate the growth and/or metabolic activity of bacteria of the genus Bifidobacterium. Additionally, the present invention provides a synthetic nutritional composition that contains a Bifidobacterium infants stimulating amount of Lacto-N-neotetrasoe, as well as edible macronutrients formulated for feeding to an infant such as one or more coconut oil, soy oil, mon-and diglycerides, glucose, edible lactose, electrodialyzed whey, electrodialyzed skim milk and milk whey; one or more of vitamins A, C, D, E and B complex; and one or more of minerals calcium, magnesium, manganese, sodium, potassium, phosphorus, copper, zinc, chloride, iodine, selenium and iron.

The present invention further provides a process of inhibiting a bacterial infection in a subject in need of such treatment. In accordance with that process, the subject is fed an effective antibacterial amount of a nutritional formulation containing Lacto-N-neoTetraose. As used herein, the term "antibacterial" refers to a substance that kills bacteria or inhibits their growth or replication.

DETAILED DESCRIPTION OF THE INVENTION

I. Nutritional Formulation

The present invention provides a synthetic nutritional formulation that contains an amount of the oligosaccharide Lacto-N-neoTetraose (LNnT, Galβ1-4GlcNAcβ1-3Galβ1-4Glc) that is effective to stimulate the growth and/or metabolic activity of bacteria of the genus Bifidobacterium. As is well known in the art, Gal designates galactose, GlcNAc designates N-acetyl-glucosamine and Glc designates glucose. Lacto-N-neoTetraose is a naturally occurring tetrasaccharide found in human breast milk.

A nutritional formulation of the present invention contains edible macronutrients, vitamins and minerals in amounts desired for a particular use. The amounts of such ingredients will vary depending on whether the formulation is intended for use with normal, healthy infants, children, or adults or subjects having specialized needs such as accompany certain pathological conditions (e.g., metabolic disorders). It will be understood by persons skilled in the art that the components utilized in a nutritional formulation of the present invention are of semi-purified or purified origin. By semi-purified or purified is meant a material which has been prepared by purification of a natural material or by synthesis. These techniques are well known in the art (See, e.g., Code of Federal Regulations for Food Ingredients and Food Processing; Recommended Dietary Allowances, 10th Ed., National Academy Press, Washington D.C., 1989).

In a preferred embodiment, a nutritional formulation of the present invention is an infant enteral nutritional product. Accordingly, in a further aspect of the invention, a nutritional formulation is provided that is suitable for feeding infants. The formula comprises, in addition to LNnT, vitamins and minerals in amounts designed to provide the daily nutritional requirements of infants. It is important to note that antimicrobial factors in human milk, or in infant formulas, may reach an infant's respiratory tract directly as a result of regurgitation and inhalation of these factors during and after feeding. The mucosa of the respiratory tract may therefore gain direct protection in this manner.

The macronutritional components include for example, edible fats, carbohydrates and proteins. Exemplary edible fats are for example, coconut oil, soy oil, and mono- and diglycerides. Exemplary carbohydrates are for example, glucose, edible lactose and hydrolyzed cornstarch. A typical protein source would be for example, soy protein, electrodialyzed whey or electrodialyzed skim milk or milk whey, or the hydrolyzates of these proteins, although other protein sources are also available and may be used. These macronutrients would be added in the form of commonly accepted nutritional compounds in amounts equivalent to those present in human milk on an energy basis, i.e., on a per calorie basis.

The infant formula would preferably include the following vitamins and minerals: calcium, phosphorous, potassium, sodium, chloride, magnesium, manganese, iron, copper, zinc, selenium, iodine, and Vitamins A, E, D, C, and the B complex.

The infant formula can be sterilized and subsequently utilized on a ready-to-feed (RTF) basis or stored in a concentrated liquid or a powder. The powder can be prepared by spray drying the infant formula prepared as indicated above, and the formula can be reconstituted by rehydrating the concentrate. Infant nutritional formulas are well known in the art and commercially available (e.g., Similac® and Alimentum® from Ross Products Division, Abbott Laboratories).

The formulations of the present invention contain an amount of LNnT effective to stimulate the growth and/or metabolic activity of bacteria of the genus Bifidobacterium. Several strains of Bifidobacterium have been described in the gut of humans, particularly infants, as discussed earlier. Those strains include Bifidobacterium infantitis (B. infantitis), Bifidobacterium breve (B. breve), Bifidobacterium bifidum (B. bifidum), and Bifidobacterium adolescentis (B. adolescentis).

LNnT can be isolated in any manner known per se from pooled human milk or produced by chemical synthesis. For example, LNnT can be synthesized chemically by enzymatic transfer of saccharide units from donor moieties to acceptor moieties using glycosyltransferases as described in U.S. Pat. No. 5,288,637 and WO96/10086, herein incorporated by reference. The preferred method for synthesizing LNnT involves the enzymatic transfer of saccharide units from saccharide-nucleotides to saccharide acceptors using glycosyltransferases where the saccharide-nucleotides and glycosyltransferases used are in an unpurified form. This preferred method is described in "A Process for Synthesizing Oligosaccharides" filed concurrently with this application. Additionally, the LNnT used in the nutritional formulation of the present invention should be in purified or partially purified form and free of bacterial toxins, viruses and other harmful contaminants.

Actual dosage levels of LNnT in the formulations of the present invention may be varied so as to obtain an amount of active ingredient that is effective to obtain a desired response for a particular composition and method of administration. The selected dosage level therefore depends upon the desired therapeutic or nutritional effect, on the route of administration, and on the desired duration of administration and other factors.

In a preferred embodiment, an amount of LNnT effective to simulate Bifidobacteria growth and/or metabolism is from about 0.05 to about 2.0 mg/ml of nutritional formulation. More preferably, an effective amount of LNnT is from about 0.075 to about 1.0 mg/ml and, most preferably from about 0.1 to about 0.5 mg/ml. Growth stimulation of the Bifidobacterium is determined as an increase in the biomass of the bacteria as determined by increases in optical density (O.D.) measurements and/or increase in the number of bacteria. The metabolism of the Bifidobacterium is considered to be stimulated when the enzymatic activity per bacterial cell increases. Preferably this metabolic stimulation is measured using enzymes from the bacteria which are constitutively active or are induced to be active prior to any measurements of metabolic stimulation (Sambrook, J., et al., Molecular Cloning A Laboratory Manual, 2d Edition, Cold Spring Harbor Laboratory Press (1989)).

II. Process of Inhibiting Bacterial Infection

In another aspect, the present invention provides a process of inhibiting infection in a subject in need of such treatment. In accordance with that process, the subject is fed a nutritional composition of the present invention. Preferred such compositions are the same as set forth above. A preferred subject is a human infant.

As disclosed herein, a formulation of the present invention can be used to inhibit bacterial infections. As used herein, the term "inhibit" means treat or prevent. As disclosed herein, LNnT can be used to inhibit bacterial infection by preventing the growth of or colonization with Bacteroides, Clostridium, and E. coli. As discussed earlier, studies have found that human breast milk inhibits the growth of Bacteroides spp., Clostridium, and E. coli. Beerens, H. et al., Amer. J Clin. Nut. 33:2434–2439 (November 1980). By inhibiting the growth of these bacteria, infants are provided with resistance against gastroenteritis.

The following examples illustrate preferred embodiments of the present invention and are not limiting of the claims and specification in any way.

EXAMPLE 1

Effect of Oligosaccharides on *Bifidobacterium infantis*

Bacterial Strains and Growth Conditions

Several carbohydrate preparations were tested for their abilities to promote growth and metabolic activity on *Bifidobacterium infantis*. Bacterial strains were purchased in lyophilized form from the American Type Culture Collection (Rockville, Md.). The strain used was *Bifidobacterium infantis* ATCC 15697.

For growth and metabolic activity assays, the *B. infantis* were grown for 24 hours in complex liquid medium (Reinforced Clostridial medium, Difco) as an inoculum source. The minimal medium base used for the assays is described below in Table 1. For each liter of growth medium, 2 ml of a sterile vitamin solution (Table 2) and 10 ml of a 5% (w/v) ascorbic acid solution (pH 6.5) were aseptically added before inoculation.

TABLE 1

| Formulation of Minimal Medium | |
|---|---|
| Sodium Acetate (anhydrous) | 1.64 g/l |
| Ammonium Chloride | 1.06 g/l |
| Potassium Phosphate (dibasic) | 2.50 g/l |
| $ZnCl_2$ | 80 μg/l |
| $FeCl_3$ | 400 μg/l |
| $CuSO_4$ | 40 μg/l |
| $MnCl_2$ | 40 μg/l |
| $Na_2B_4O_7$ | 40 μg/l |
| $(NH_4)_6Mo_7O_{24}$ | 40 μg/l |
| Tween 80 | 0.50 ml/l |
| Lactose | 2.00 g/l |
| Proteose Peptone (Difco) | 1.00 g/l |

The pH was adjusted to 6.8 and the formulation sterilized by autoclaving. Before inoculation, a vitamin solution and ascorbic acid were aseptically added.

TABLE 2

| Vitamin solution: | |
|---|---|
| Riboflavin | 500 mg/l |
| p-Aminobenzoate | 50 mg/l |
| Pyridoxine | 250 mg/l |
| Nicotinic acid | 500 mg/l |
| Thiamine | 250 mg/l |
| Biotin | 100 mg/l |

TABLE 2-continued

| Vitamin solution: | |
|---|---|
| Calcium pantothate | 500 mg/l |
| Folic acid | 100 mg/l |

Bacterial Metabolic Activity Stimulation Assays

The assays for measuring stimulation of the metabolic activity of the bacteria are based on the determination of enzymatic activity per bacterial cell. The β-galactosidase and esterase activities of *Bifidobacterium infantis* were measured. Each sample (1.5 ml total volume) was inoculated with approximately $10^5$ bacterial cells. *Bifidobacterium infantis* was grown for 24 hours in a growth medium. After washing the cells, the cell culture was centrifuged (in the anaerobe chamber) for 5 minutes at 2000×g to obtain a cell pellet. The supernatant was discarded, the pellet was gently resuspended in 1.5 ml of phosphate buffered saline (PBS; pH 7.2) and the suspension was mixed with one of the following test compounds (previously dissolved in a buffer) at a concentration of 0.1 and/or 1.0 mg/ml:

| | |
|---|---|
| 2% human breast milk | (2% bm) |
| Lacto-N-neotetraose | (LNnT) |
| Fructooligosaccharides | (FOS) |
| Galactooligosaccharides | (GOS) |
| Sucrose | |
| N-acetylglucosamine and sucrose | (GlcNAc:Sucrose) |
| Glucosamine and sucrose | (GlcNH$_3$:Sucrose) |

This mixture was incubated under anaerobic conditions at 37° C. for one hour. Serial dilutions of the mixture were made, and they were plated on complex growth medium plates, which were incubated 48 hours at 37° anaerobically and then counted. The remainder of the cell suspension (1.0 ml) was used for whole cell enzyme assays.

The substrates 5-bromo-4-chloro-3-indolyl β-d-galactopyranoside (X-Gal) and 5-bromo-4-chloro-3-indolyl acetate (X-Act) were used to measure β-galactosidase and esterase activities respectively. Both substrates were purchased from Sigma Chemical Co. (St. Louis, Mo.). Each substrate was added to the cell suspension to a final concentration of 20 μM. The rate of hydrolysis was monitored in a DU 7400 spectrophotometer (Beckman Instruments, Inc., Palo Alto, Calif.) at 600 nm using the substrate in PBS as a blank. Readings were taken at 0, 15 and 30 minutes and the change in absorbance per minute (dA/min) calculated. The results are shown below in Table 3.

A utilization index (UI) for the substrate was calculated using the rate of substrate hydrolysis and the cfu/ml values obtained from the plate count determinations. The equation used for this calculation is as follows: UI=(Rate of substrate utilization×(cfu/ml)$^{-1}$×(assay volume)$^{-1}$×$10^{10}$. The results are shown below in Table 3.

TABLE 3

Metabolic Stimulation of *B. Infantis*

| Sample | Conc. (Mg/mL) | BGUI[1] | AUI[2] |
|---|---|---|---|
| 2% bm | 0.1 | 64.7 | 87.3 |
| LNnT | 1 | 11.2 | 3.2 |
| LNnT | 0.1 | 83.9 | 11.2 |
| FOS | 1 | 15.1 | 3 |
| FOS | 0.1 | 23.7 | 3.9 |
| GOS | 1 | 14.7 | 2 |
| GOS | 0.1 | 17.3 | 2.3 |

TABLE 3-continued

Metabolic Stimulation of *B. Infantis*

| Sample | Conc. (Mg/mL) | BGUI[1] | AUI[2] |
|---|---|---|---|
| Sucrose | 1 | 8.8 | 1 |
| Sucrose | 0.1 | 9.4 | 0.9 |
| 15:55 GlcNAc:Sucrose[3] | 1 | 12.8 | 2.3 |
| GlcNAc:Sucrose[3] | 0.1 | 10.8 | 1.9 |
| 18:44 GlcNH$_3$:Sucrose[4] | 1 | 16.9 | 1 |
| GlcNH$_3$:Sucrose[4] | 0.1 | 11.6 | 1.4 |

[1]BFUI = β-galactosidase utilization index (β-galactosidase activity/cell)
[2]AUI = acetate utilization index (esterase activity/cell)
[3]GlcNAc (N-acetylglucosamine) was mixed with sucrose in the ratio given prior to sampling.
[4]GlcNH$_3$ (Glucosamine) was mixed with sucrose in the ratio given prior to sampling.

The results in Table 3 demonstrate that LNnT is an excellent metabolic stimulant of *B. infantis*. In the BGUI, the activity of LNnT is seconded by that of a 2% human breast milk solution, which is known to contain LNnT. In the AUI, other than breast milk, none of the other tested compounds exhibited activity close to LNnT.

Bacterial Growth Assays

The assays for measuring the growth of the bacteria are based upon the lactic acid produced per bacterial cell. The bacteria were cultured in the medium containing either no carbohydrate, LnnT, Fructooligosaccharides (FOS), Galactooligosaccharides (GOS), Sucrose, N-acetylglucosamine and sucrose (GlcNAc:Sucrose) and glucosamine and sucrose (GlcNH$_3$:sucrose). After approximately 24–48 hours, carbohydrate fermentation was measured by optical density, pH and lactic acid production. *E. coli* (ATCC 25922) does not produce lactic acid under these conditions and serves as a negative control for the lactic acid end point. Optical density serves as a qualitative end point.

TABLE 4

| | Lactic Acid Concentration | |
|---|---|---|
| | Calculated Lactic Acid Concentration | Lactic Acid Concentration Less Background |
| No Carbohydrate | 0.598 | 0.010 |
| Sample A - 1 mg/ml LNnT | 0.630 | 0.070 |
| Sample B - 1 mg/ml FOS | 0.581 | 0.000 |
| Sample C - 1 mg/ml GOS | 0.628 | 0.010 |
| Sample D - 1 mg/ml Sucrose | 0.576 | 0.00 |
| Sample E - 1 mg/ml GlcNAC:sucrose | 0.577 | 0.000 |
| Sample F - 1 mg/ml GlcNH$_3$:sucrose | 0.584 | 0.010 |
| Sample G - 0.1 mg/ml LNnT | 0.578 | 0.020 |
| Sample H - 0.1 mg/ml FOS | 0.603 | 0.050 |
| Sample I - 0.1 mg/ml GOS | 0.583 | 0.030 |
| Sample J - 0.1 mg/ml Sucrose | 0.570 | 0.000 |
| Sample K - 0.1 mg/ml GlcNAC:sucrose | 0.578 | 0.000 |
| Sample L - 0.1 mg/ml GlcNH$_3$:sucrose | 0.594 | 0.010 |

EXAMPLE 2

Ready-to-Feed Infant Formulation Containing LNnT

A ready-to-feed infant formulation containing the oligosaccharide LNnT has the following composition (5 fluid ounces=100 Cal):

|  | Per 100 Cal: |
| --- | --- |
| Nutrients: | |
| Protein | 2.14 g |
| Fat | 5.40 g |
| Carbohydrates | 10.7 g |
| Lacto-N-neoTetraose | 71.0 g |
| Water | 133 g |
| Linoleic Acid | 1300 mg |
| Vitamins: | |
| Vitamin A | 300 IU |
| Vitamin D | 60 IU |
| Vitamin E | 3.0 IU |
| Vitamin K | 8 mcg |
| Thiamine (Vit. $B_1$) | 100 mcg |
| Riboflavin (Vit. $B_2$) | 150 mcg |
| Vitamin $B_6$ | 60 mcg |
| Vitamin $B_{12}$ | 0.25 mcg |
| Niacin | 1050 mcg |
| Folic Acid (Folacin) | 15 mcg |
| Pantothenic Acid | 450 mcg |
| Biotin | 4.4 mcg |
| Vitamin C (Ascorbic Acid) | 9 mg |
| Choline | 16 mg |
| Inositol | 4.7 mg |
| Minerals: | |
| Calcium | 73 mg |
| Phosphorus | 56 mg |
| Magnesium | 7.5 mg |
| Iron | 1.8 mg |
| Zinc | 0.75 mg |
| Manganese | 30 mcg |
| Copper | 75 mcg |
| Iodine | 15 mcg |
| Sodium | 44 mg |
| Potassium | 108 mg |
| Chloride | 62 mg |

The above-described infant formulation can be used when an infant formula is needed, such as if the decision is made to discontinue breast feeding before age 1 year, if a supplement to breast feeding is needed or as a routine feeding if breast feeding is not adopted.

EXAMPLE 3

Ready-to-Feed Soy Infant Formulation Containing LNnT

A ready-to-feed soy infant formulation containing the oligosaccharide LNnT has the following composition (5 fluid ounces=100 Cal):

|  | Per 100 Cal: |
| --- | --- |
| Nutrients: | |
| Protein | 2.45 g |
| Fat | 5.46 g |
| Carbohydrates | 10.3 g |
| Lacto-N-neoTetraose | 14.2 g |
| Water | 133 g |
| Linoleic Acid | 1300 mg |
| Vitamins: | |
| Vitamin A | 300 IU |
| Vitamin D | 60 IU |
| Vitamin E | 3.0 IU |
| Vitamin K | 15 mcg |
| Thiamine (Vit. $B_1$) | 60 mcg |
| Riboflavin (Vit. $B_2$) | 90 mcg |
| Vitamin $B_6$ | 60 mcg |
| Vitamin $B_{12}$ | 0.45 mcg |
| Niacin | 1350 mcg |
| Folic Acid (Folacin) | 15 mcg |
| Pantothenic Acid | 750 mcg |
| Biotin | 4.5 mcg |
| Vitamin C (Ascorbic Acid) | 9 mg |
| Choline | 8 mg |
| Inositol | 5 mg |
| Minerals: | |
| Calcium | 105 mg |
| Phosphorus | 75 mg |
| Magnesium | 6 mg |
| Iron | 0.22 mg |
| Zinc | 0.75 mg |
| Manganese | 5 mcg |
| Copper | 90 mcg |
| Iodine | 9 mcg |
| Sodium | 27 mg |
| Potassium | 105 mg |
| Chloride | 64 mg |

The above-described infant formulation can be used when soy feeding is desired and an infant formula is needed, such as if the decision is made to discontinue breast feeding before age 1 year, if a supplement to breast feeding is needed or as a routine feeding if breast feeding is not adopted.

What is claimed is:

1. A synthetic nutritional composition comprising Lacto-N-neoTetraose in an amount sufficient to stimulate the growth of *Bifidobacterium infantis*, the metabolic activity of *Bifidobacterium infantis* or both properties thereof.

2. The composition of claim 1 further comprising edible macronutrients.

3. The composition of claim 2 wherein the edible macronutrients are formulated for feeding to an infant.

4. The composition of claim 3 wherein the macronutrients comprise one or more of coconut oil, soy oil, mono- or diglycerides, glucose, edible lactose, electrodialysed whey or electrodialysed skim milk, milk whey, soy protein, or other protein hydrolysates.

5. The composition of claim 1 that is in liquid form.

6. The composition of claim 1 that is in solid form.

7. The composition of claim 1 further comprising one or more of vitamins A, C, D, E on B complex.

8. The composition of claim 1 further comprising one or more of minerals calcium, magnesium, manganese, sodium, potassium, phosphorus, copper, zinc, chloride, iodine, selenium or iron.

9. The composition of claim 1 containing from about 0.05 to about 2.0 mg/ml of Lacto-N-neoTetraose.

10. The composition of claim 9 containing from about 0.075 to about 1.0 mg/ml of Lacto-N-neoTetraose.

11. The composition of claim 10 containing from about 0.1 to about 0.5 mg/ml of Lacto-N-neoTetraose.

12. A synthetic nutritional composition comprising Lacto-N-neoTetraose in an amount sufficient to stimulate the growth of *Bifidobacterium infantis*, the metabolic activity of *Bifidobacterium infantis*, or both properties thereof; edible macronutrients formulating for feeding to an infant and comprising one or more of coconut oil, soy oil, mono- or diglycerides, glucose, edible lactose, electrodialyzed whey, electrodialyzed skim milk or milk whey; one or more of vitamins A, C, D, E or B complex; and one or more of minerals calcium, magnesium, manganese, sodium, potassium, phosphorus, copper, zinc, chloride, iodine, selenium or iron.

* * * * *

UNITED STATES PATENT AND TRADEMARK OFFICE
CERTIFICATE OF CORRECTION

PATENT NO. : 5,906,982
DATED : May 25, 1999
INVENTOR(S) : Prieto et al.

It is certified that error appears in the above-identified patent and that said Letters Patent is hereby corrected as shown below:

Column 10, line 2, change "or" to --and--.

Signed and Sealed this

Eleventh Day of April, 2000

Attest:

Q. TODD DICKINSON

Attesting Officer

*Director of Patents and Trademarks*